(12) United States Patent
Zha et al.

(10) Patent No.: US 10,295,713 B2
(45) Date of Patent: May 21, 2019

(54) COLOR FILTER SUBSTRATE, PREPARING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Changjun Zha, Beijing (CN); Min Li, Beijing (CN); Jingjing Jiang, Beijing (CN); Hongjiang Wu, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 298 days.

(21) Appl. No.: 14/436,388

(22) PCT Filed: Aug. 21, 2014

(86) PCT No.: PCT/CN2014/084910
§ 371 (c)(1),
(2) Date: Apr. 16, 2015

(87) PCT Pub. No.: WO2015/081732
PCT Pub. Date: Jun. 11, 2015

(65) Prior Publication Data
US 2015/0285968 A1    Oct. 8, 2015

(30) Foreign Application Priority Data

Dec. 2, 2013  (CN) .......................... 2013 1 0632632

(51) Int. Cl.
*G02B 5/20* (2006.01)
*G02F 1/1335* (2006.01)
*G02F 1/1339* (2006.01)

(52) U.S. Cl.
CPC .......... *G02B 5/201* (2013.01); *G02F 1/13394* (2013.01); *G02F 1/133512* (2013.01);
(Continued)

(58) Field of Classification Search
CPC ............... G02B 5/201; G02F 1/133512; G02F 1/13394; G02F 1/133516;
(Continued)

(56) References Cited

U.S. PATENT DOCUMENTS

| | | |
|---|---|---|
| 2009/0115954 A1 | 5/2009 | Tseng et al. |
| 2010/0110022 A1 | 5/2010 | Chen et al. |
| 2012/0008120 A1* | 1/2012 | Matsui .................. G03F 7/0007 355/53 |

FOREIGN PATENT DOCUMENTS

| | | |
|---|---|---|
| CN | 102346339 A | 2/2012 |
| CN | 102645793 A | 8/2012 |

(Continued)

OTHER PUBLICATIONS

Oct. 8, 2016—(CN) Fourth Office Action Appn 201310632632.5 with English Tran.

(Continued)

*Primary Examiner* — Wen Huang
(74) *Attorney, Agent, or Firm* — Banner & Witcoff, Ltd.

(57) ABSTRACT

A color filter substrate, a preparing method thereof and a display device are provided. The method includes: preparing a black matrix pattern and a color filter pattern on a substrate; preparing planarization layer and spacers including primary spacers and secondary spacers. The black matrix pattern includes primary areas and secondary areas, and the primary area has a width in the column direction of the black matrix pattern greater than the width of the secondary area in the column direction of the black matrix pattern. The primary spacers are located on primary areas of the black matrix pattern; and the secondary spacers are located on secondary areas of the black matrix pattern, the primary spacers have a height greater than that of the secondary spacers.

20 Claims, 4 Drawing Sheets

(52) U.S. Cl.
CPC ............... *G02F 1/133516* (2013.01); *G02F 2001/13396* (2013.01)

(58) Field of Classification Search
CPC ......... G02F 2001/13396; G02F 1/1368; G02F 1/133514; G02F 1/13396
USPC ........................................................ 359/891
See application file for complete search history.

(56) References Cited

FOREIGN PATENT DOCUMENTS

| | | | |
|---|---|---|---|
| CN | 103018950 A | 4/2013 | |
| CN | 103135334 A | 6/2013 | |
| CN | 103268037 A | 8/2013 | |
| CN | 103676293 A | 3/2014 | |

OTHER PUBLICATIONS

Oct. 20, 2015—(CN)—Second Office Action Appn 201310632632.5 with English Tran.
Mar. 30, 2016—(CN)—Second Office Action Appn 201310632632.5 with English Tran.
Nov. 26, 2014—International Search Report for PCT/CN2014/084910 with Eng Tran of Written Opinion.
Feb. 28, 2015—(CN) First Office Action of No. 201310632632.5 dated Feb. 28, 2015 with Eng Tran.

\* cited by examiner

COLOR FILTER SUBSTRATE, PREPARING METHOD THEREOF, AND DISPLAY DEVICE

The application is a U.S. National Phase Entry of International Application No. PCT/CN2014/084910 filed on Aug. 21, 2014, designating the United States of America and claiming priority to Chinese Patent Application No. 201310632632.5 filed on Dec. 2, 2013. The present application claims priority to and the benefit of the above-identified applications and the above-identified applications are incorporated by reference herein in their entirety.

TECHNICAL FIELD

At least one embodiment of the present invention relates to a color filter substrate and a preparing method thereof as well as a display device.

BACKGROUND

A liquid crystal display (LCD) may include an array substrate, a color filter substrate and a liquid crystal layer disposed therebetween. A color filter substrate is an optical light-filtering structure for displaying colors in an LCD. Spacers are provided on the color filter substrate to determine a cell gap between the color filter substrate and the array substrate to keep an optimal thickness of the liquid crystal layer. Spacers with similar sizes distributed uniformly may be selected to obtain liquid crystal panels with high contrast, wide viewing angle and fast response.

Spacers may be classified into sphere-like spacers, rod-shaped spacers and post-like spacers according to their form factors. Post-like spacers possess features such as easy-to-control size, high contrast, good uniformity and high degree of durability, and LCDs adopting post-like spacers are less likely to encounter tailing effect as compared to those with sphere-like spacers or rod-like spacers. Therefore, post-like spacers have been applied widely. For realizing best supporting effect, post-like spacers may be further classified into primary post-like spacers and secondary post-like spacers with proper height difference therebetween. At present, there are basically two methods for preparing post-like spacers, i.e., the methods using ordinary masks and using transflective film masks.

SUMMARY

At least one embodiment of the present invention provides a color filter substrate and a preparing method thereof to reduce preparing costs of color filter substrates, and enable primary spacers and secondary spacers with height difference and similar sizes to be easily formed on the color filter substrate. Furthermore, these two types of spacers have more uniform forms, which functions to realize better supporting effect and improve the display quality.

At least one embodiment of the present invention provides a preparing method of a color filter substrate, including: preparing a black matrix pattern and a color filter pattern on a substrate; preparing a planarization layer on the color filter pattern and the black matrix pattern; and preparing spacers on the planarization layer. The black matrix pattern includes primary areas and secondary areas, and the primary area has a width in the column direction of the black matrix pattern greater than the width of the secondary area in the column direction of the black matrix pattern; the spacers include primary spacers and secondary spacers; the primary spacers are located on primary areas of the black matrix pattern; and the secondary spacers are located on secondary areas of the black matrix pattern, the primary spacers have a height greater than that of the secondary spacers.

At least one embodiment of the present invention further provides a color filter substrate including: a black matrix pattern, wherein the black matrix pattern comprises primary areas and secondary areas, and the primary area has a width in a column direction of the black matrix pattern greater than a width of the secondary area in the column direction of the black matrix pattern; a color filter pattern; A planarization layer located on the color filter pattern and the black matrix pattern; and Primary spacers and secondary spacers formed on the planarization layer. The primary spacers are located on primary areas of the black matrix pattern; and the secondary spacers are located on secondary areas of the black matrix pattern, the primary spacers have a height greater than that of the secondary spacers.

At least one embodiment of the present invention further provides a display device including the above-mentioned color filter substrate.

BRIEF DESCRIPTION OF ACCOMPANYING DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

Reference numerals:

| | | |
|---|---|---|
| 1-Substrate; | 2-Black matrix pattern; | 3-Primary area; |
| 4-Secondary area; | 5-Color filter pattern: | 6-Planarization layer; |

-continued

Reference numerals:

7-Primary spacers; 8-Secondary spacers; 9-Spacer mask;
10-First opening; 11-Second opening; 20-Array substrate;
30-Color filter substrate; 35-Sealant; 40-Liquid crystal material;
50-Backlight source

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the embodiments of the present invention, those skilled in the art can obtain other embodiment(s), without any inventive work, which should be within the scope of the invention.

Inventors of the present application have noted that, in fabricating post-like spacers with ordinary masks, if post-like spacers are designed with different sizes, primary post-like spacers have large sizes while secondary post-like spacers have small sizes. In the fabrication process, it is possible to control the amount of light exposure by controlling the sizes of openings on the mask, thereby realizing height difference between primary post-like spacers and secondary post-like spacers. However, the height difference between them can only be realized when primary post-like spacers and secondary post-like spacers have quite different sizes. In such a condition, since the sizes of primary spacer and secondary spacers are significantly different from each other, the surface morphology of the upper surfaces of the formed primary spacers and secondary spacers also differ significantly from each other. Primary spacers have relatively flat surface topography, while secondary spacers have rough surfaces, and convex and concave occur due to the secondary spacers' small sizes. This non-uniform topography would bring about direct detrimental impact to the supporting effect of spacers. On the other hand, while fabricating post-like spacers with transflective film masks, costs are high although primary post-like spacers and secondary post-like spacers may have similar sizes.

In at least one embodiment of the present invention, a liquid crystal display (LCD) includes an array substrate, a color filter substrate and a liquid crystal layer therebetween. For example, spacers are located on the color filter substrate to deter mine the cell gap between the color filter substrate and the array substrate.

Embodiment 1

Figure 1:
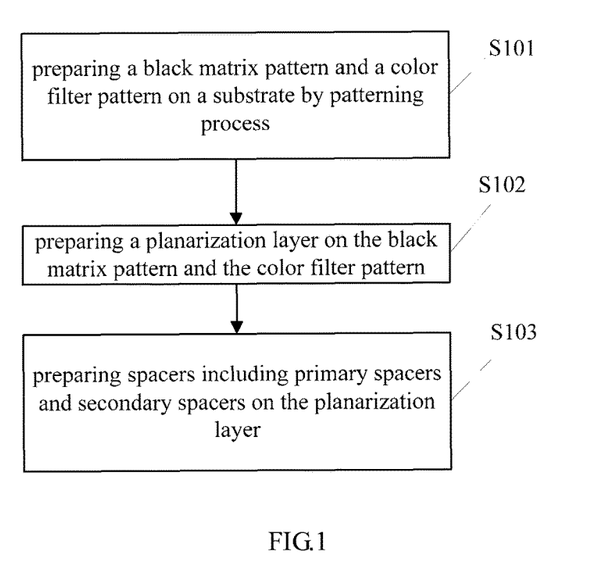
FIG. 1 is a flow chart of a preparing method of a color filter substrate in an embodiment of the present invention.

At least one embodiment of the present invention provides a preparing method of a color filter substrate as shown in FIG. 1, including the following steps.

In step S101, a black matrix pattern and a color filter pattern are formed on a substrate by for example a patterning process. In one example, the black matrix pattern includes primary areas and secondary areas, and a primary area has a width in the column direction of the black matrix pattern greater than that of a secondary area in the column direction of the black matrix pattern.

In step S102, a planarization layer is fabricated on the brick matrix pattern and the color filter pattern.

In step S103, spacers are fabricated on the planarization layer which includes primary spacers and secondary spacers. In one example, primary spacers are located on primary areas of the black matrix pattern, secondary spacers are located on secondary areas of the black matrix pattern, and primary spacers have greater heights than secondary spacers.

It is to be noted that the black matrix pattern includes primary areas and secondary areas. For example, any row of the black matrix pattern includes primary areas and/or secondary areas. For example, this setting may be extended to the following cases.

Figure 2:
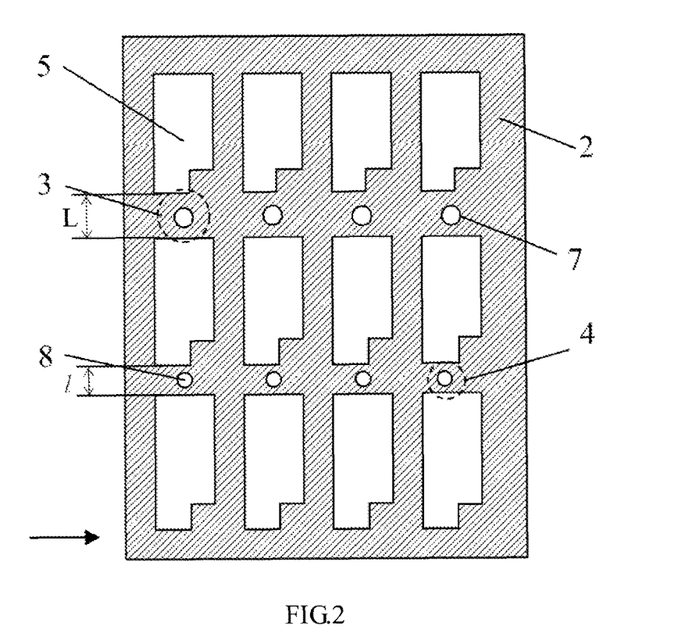
FIG. 2 is a plan view of a first color filter substrate in an embodiment of the present invention.

In case I, as shown in FIG. 2, at least one row of the black matrix pattern 2 includes only primary areas 3, and another row of the black matrix pattern 2 include only secondary areas 4.

Figure 3:
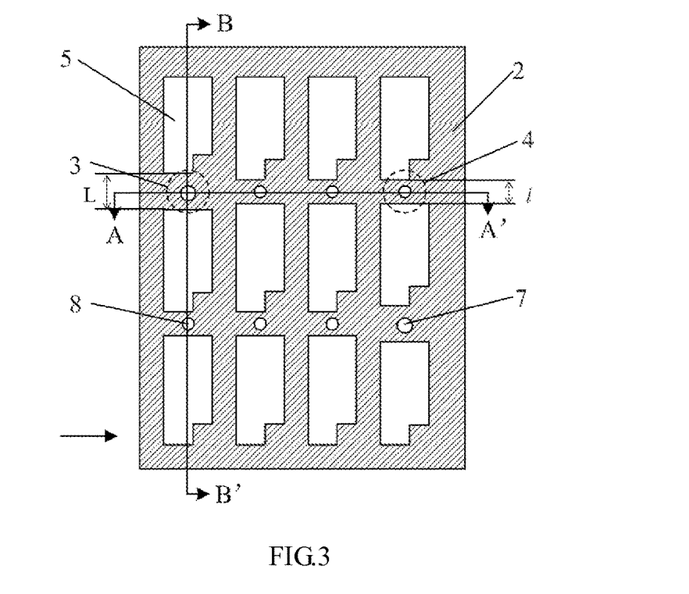
FIG. 3 is a plan view of a second color filter substrate in an embodiment of the present invention.

In case II, as shown in FIG. 3, each row of the black matrix pattern 2 includes both primary areas 3 and secondary areas 4.

In case III, at least one row of the black matrix pattern 2 includes only primary areas 3, and another row of the black matrix pattern 2 include both primary areas 3 and secondary areas 4.

In case IV, at least one row of the black matrix pattern 2 includes only secondary areas 4, and another row of the black matrix pattern 2 include both primary areas 3 and secondary areas 4.

In case V, at least one row of the black matrix pattern 2 includes only primary areas 3, at least one row of the black matrix pattern 2 includes only secondary areas 4, and another row of the black matrix pattern 2 include both primary areas 3 and secondary areas 4.

Figure 4:
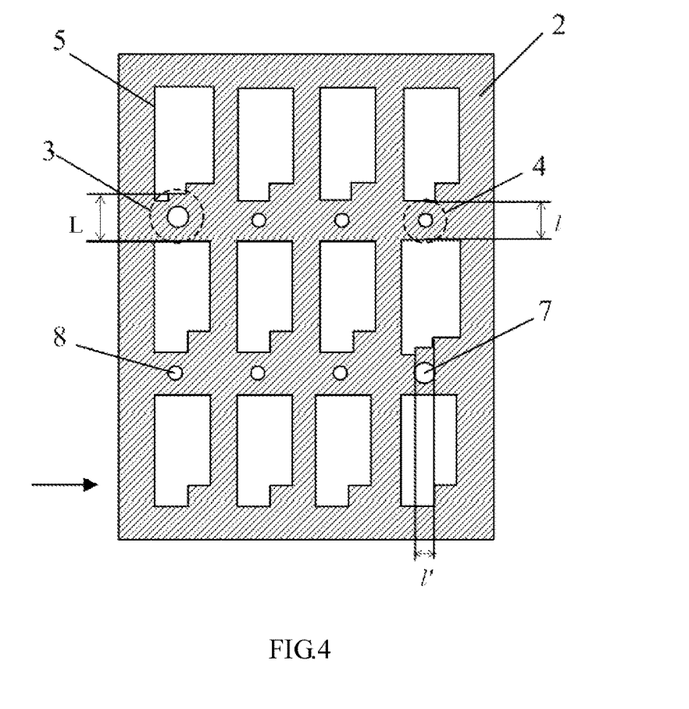
FIG. 4 is a plan view of a third color filter substrate in an embodiment of the present invention.

It is to be noted that any row of the black matrix pattern 2 including primary areas 3 and/or secondary areas 4 includes the above five cases rather than being limited to the above five cases. In an embodiment of the present invention, the black matrix pattern 2 on the substrate may further include several rows of the black matrix pattern that neither include primary area nor secondary area in addition to the black matrix pattern described in case I. Similarly, it is also possible to extend cases I to V according to practical situation, and extensions will not be enumerated herein in embodiments of the present invention. In FIGS. 2-4, large circles correspond to primary post-like spacers while small circles correspond to secondary post-like spacers; the row direction of the black matrix corresponds to the horizontal direction (direction of arrow in the figure), while column direction of the black matrix correspond to the direction perpendicular to the horizontal direction.

In addition, for example, the length of a primary area 3 in the row direction of the black matrix pattern 2 may be greater than or equal to the width of primary spacers 7, and the length of a secondary area 4 in the row direction of the black matrix pattern 2 may be greater than or equal to the width of the secondary spacers 8. For example, as shown in FIGS. 2 and 3, the length of a primary area 3 in the row direction of the black matrix pattern 2 is greater than the width of primary spacers 7, and the length of a secondary area 4 in the row direction of the black matrix pattern 2 is greater than the width of the secondary spacers 8. Alternatively, as shown in FIG. 4, the length l' of a primary area 3 in the row direction of the black matrix pattern 2 is equal to the width of primary spacers 7, and the length of a secondary area 4 in the row direction of the black matrix pattern 2 is equal to the width of the secondary spacers 8. In addition, other cases may be further included, and these cases will not be enumerated in embodiments of the present invention. The spacers manufactured in embodiments of the present invention may be post-like spacers, and may also be spacers of other shapes, which is not limited in embodiments of the present invention.

Figure 5:
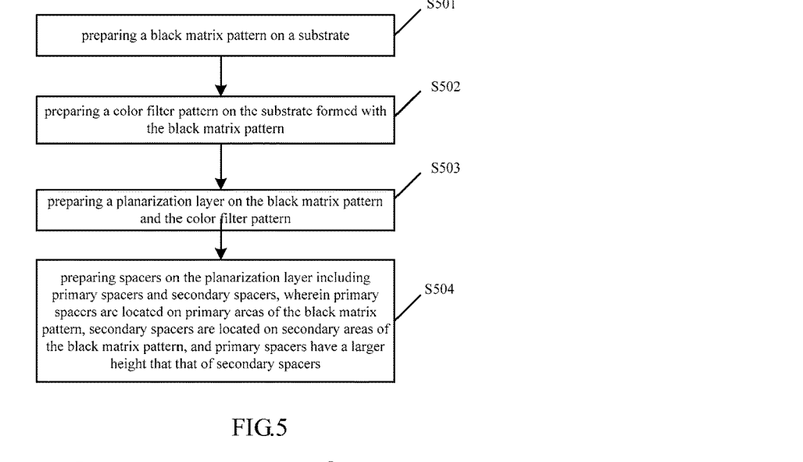
FIG. 5 is a specific flow chart of a preparing method of a color filter substrate as shown in FIG. 1 in an embodiment of the present invention.
Figure 6:
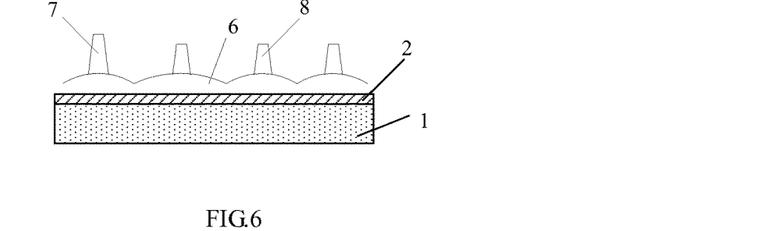
FIG. 6 is a schematic cross-sectional view along the A-A' direction of the color filter substrate as shown in FIG. 3 in an embodiment of the present invention.
Figure 7:
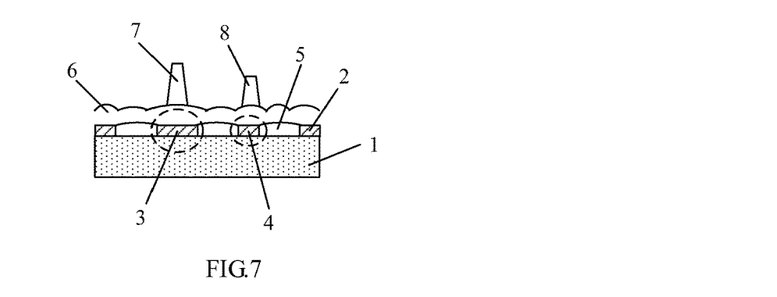
FIG. 7 is a schematic cross-sectional view along the B-B' direction of the color filter substrate shown in FIG. 3 in an embodiment of the present invention.

In order to describe the preparing methods of a color filter substrate provided in the embodiments of the present invention more clearly, the preparing method of the color filter substrate shown in FIG. 1 may be extended to the preparing method as shown in FIG. 5, with the manufactured color filter substrate as shown in FIGS. 6 and 7, which preparing method includes the following steps.

In step S501, a black matrix pattern is manufactured on a substrate.

For example, in a liquid crystal display, in order to improve the contrast of the liquid crystal display, a black matrix pattern 2 can be provided on the color filter substrate to shield structures such as data lines, gate lines and thin film transistors and avoid light leak phenomenon between subpixels in operation of the display. Therefore, the material for black matrix pattern 2 may have strong light-proof property and low reflectivity, such as carbon black or black resin.

As shown in FIGS. 6 and 7, in one example, firstly, a layer of material for black matrix pattern 2 is coated the substrate 1, and is then covered by a black matrix mask with the required pattern, and a black matrix pattern 2 with the desired pattern is obtained on the substrate 1 after for example ultraviolet light exposure and development steps.

In the embodiments of the present invention, the black matrix pattern 2 includes primary areas 3 and secondary areas 4, and the width L of the primary area 3 in the column direction of the black matrix pattern 2 is greater than the width l of the secondary area 4 in the column direction of the black matrix pattern 2. In the preparing process of the black matrix pattern 2, different widths and lengths of primary areas 3 and secondary areas 4 are controlled through the size of the black matrix mask.

In step S502, a color filter pattern is formed on the substrate formed with the black matrix pattern.

The color filter pattern 5 mainly functions to implement color display by selectively transmitting and absorbing white light, therefore the color filter pattern 5 may have high transmittance. In one example, the color filter pattern 5 includes red areas, green areas and blue areas, and each includes a resin material colored by organic pigments of corresponding colors.

The color filter pattern 5 may be manufactured on the substrate 1 by methods such as ink-jet printing, pigment dispersion or printing method. In one example, the color filter pattern 5 includes red, green and blue areas that may be manufactured in turn in three processes. For example, a layer of red resin material is firstly coated on the entire substrate and then covered by a corresponding color filter mask for exposure and development to obtain red areas in the color filter pattern 5. Then, a layer of green resin material is coated on the entire substrate and then covered by a corresponding color filter mask for exposure and development to obtain green areas in the color filter pattern 5.

Finally, a layer of blue resin material is coated on the entire substrate and then covered by a corresponding color filter mask for exposure and development to obtain blue areas in the color filter pattern 5 ultimately. After the above-mentioned process, a layer of color filter pattern 5 including red areas, green areas and blue areas is formed on the entire substrate.

It is to be noted that embodiments of the present invention are not limited to the above-mentioned materials, orders etc. For example, the preparation order of the black matrix pattern 2 and the color filter pattern 5 may be different from the above-mentioned preparation order. In the preparing process of the color filter substrate, it is also possible to manufacture the color filter pattern 5 firstly and then manufacture the black matrix pattern 2. If the color filter pattern 5 is firstly manufactured, it is possible to allow different areas of the color filter pattern 5 to have different widths and lengths such that the primary areas 3 and secondary areas 4 of the subsequently manufactured black matrix pattern 2 have different widths and/or lengths. In the step S101 in the embodiment of the present invention, in preparing the black matrix pattern 2 and the color filter pattern 5 on the substrate 1 by for example patterning process, it is possible to firstly manufacture the black matrix pattern 2, then manufacture the color filter pattern 5; it is also possible to firstly manufacture the color filter pattern 5 and then the black matrix pattern 2; alternatively, according to the practical situation, it may further include preparing both the black matrix 2 and the color filter pattern 5 by for example one patterning process.

In step S503, a planarization layer is fabricated on the black matrix pattern and the color filter pattern.

By preparing the planarization layer 6 on the black matrix pattern 2 and the color filter pattern 5, it is possible to make the surfaces of the black matrix pattern 2 and the color filter pattern 5 more flat to a certain extent. The planarization layer 6 may include different structure according to different conditions. For example, the planarization layer 6 may include a transparent protection layer that functions to better protect the color filter pattern 5, improve its surface smoothness and prevent it from contaminating the liquid crystal after cell assembling. The material for the transparent protection layer is for example a high molecular material of epoxy or acrylic resin. According to demands of different display modes, the planarization layer 6 may further include a transparent conductive layer. For example, a transparent conducting material such as indium tin oxide or indium zinc oxide may be selected for the transparent conductive layer.

In step S504, spacers are fabricated on the planarization layer which includes primary spacers and secondary spacers. In one example, primary spacers are located on primary areas of the black matrix pattern, secondary spacers are located on secondary areas of the black matrix pattern, and primary spacers have greater heights than secondary spacers.

In the embodiment of the present invention, in order to maintain the thickness of the liquid crystal cell and obtain a liquid crystal panel with high contrast, wide viewing angle and fast response, spacers distributed uniformly may be provided on the color filter substrate.

Spacers may be classified into primary spacers 7 and secondary spacers 8. Secondary spacers 8 function to restore the color filter substrate and the array substrate quickly while these substrates are subjected to an external force to change the thickness. In case there are only primary spacers 7 but no secondary spacers 8, when a large press is applied to cell-assemble the color filter substrate and the array substrate, vacuum bubbles tend to occur therein, and gravity defects tends to occur during operation. Primary spacers 7 and secondary spacers 8 may have a suitable height difference for realizing optimal supporting effect, which is generally 0.3~0.5 μm.

As shown in FIGS. 6 and 7, the primary spacers 7 are located on primary areas 3 of the black matrix pattern 2; and the secondary spacers 8 are located on secondary areas 4 of the black matrix pattern 2.

In the embodiment of the present invention, the process of preparing primary spacers 7 and secondary spacers 8 on the planarization layer 6 may be as follows.

Firstly, for example, photoresist is coated on the planarization layer 6 by for example spin coating or slit coating such that a layer of photoresist is uniformly coated on the entire planarization layer 6.

Figure 8:
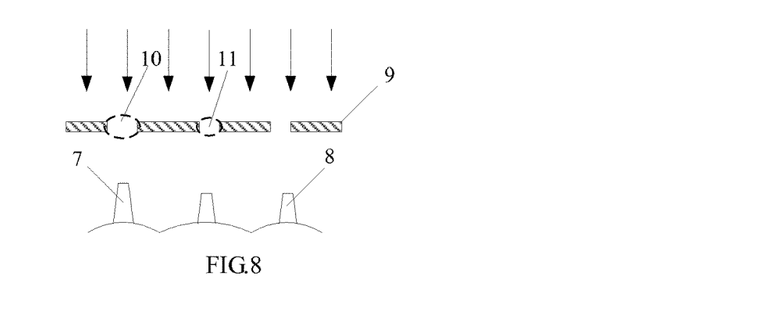
FIG. 8 is a schematic view of the exposure process for forming spacers in an embodiment of the present invention.

Secondly, as shown in FIG. 8, a spacer mask 9 with corresponding pattern is used for covering. First openings 10 corresponding to primary spacers 7 and second openings 11 corresponding to secondary spacers 8 are uniformly distributed on the spacer mask 9. The larger the size of an opening, the more sufficient the exposure is during the exposure process thereafter, and the higher the resultant spacer is, therefore, the size of the first openings 10 is larger than the size of the second openings 11. At the same time, in the embodiment of the present invention, the sizes of the first openings 10 and the second openings 11 are approximately close to each other, that is, sizes of the first openings 10 and the second openings 11 differ slightly.

Again, the photoresist is exposed with a spacer mask 9 and developed to form primary spacers 7 and secondary spacers 8. Since first openings 10 and second openings 11 on the spacer mask 9 have different sizes, primary spacers 7 and secondary spacers 8 can be obtained on the planarization layer 6 after exposure and development for a certain time period. Primary spacers 7 and secondary spacers 8 have a height difference of 0.3~0.5 μm.

In the embodiment of the present invention, since the sizes of first openings 10 and second openings 11 on the mask 9 used to form spacers differ slightly, the resultant primary spacers 7 and secondary spacers 8 have a proper height difference. The reason for that is as follows.

Primary spacers 7 and secondary spacers 8 are located in primary areas 3 and secondary areas 4 of the black matrix pattern 2 respectively, while primary areas 3 and secondary areas 4 of the black matrix pattern 2 have different widths in the column direction of the black matrix pattern. Since primary areas 3 and secondary areas 4 of the black matrix pattern 2 have different widths in column direction of the black matrix pattern, while forming the planarization layer 6 on the black matrix pattern 2 and the color filter pattern 5, the planarization layer 6 formed at primary spacers 7 have a larger height than that of planarization layer 6 at secondary spacers 8, and are flatter. In this way, before forming primary spacers 7 and secondary spacers 8, the planarization layer 6 already has a height difference at locations where they are located, and based on this height difference, openings of the mask for forming primary spacers 7 and secondary spacers 8 with specific height difference may have small difference. Therefore, in case that openings for primary spacers 7 and secondary spacers 8 on the mask have small difference, primary spacers 7 and secondary spacers 8 with a height difference but a similar size may be easily formed on the color filter substrate. Because these two spacers have approximate sizes, the manufactured two spacers have more uniform topography which also improves the supporting effect of spacers and enhances the display quality.

Figure 9:
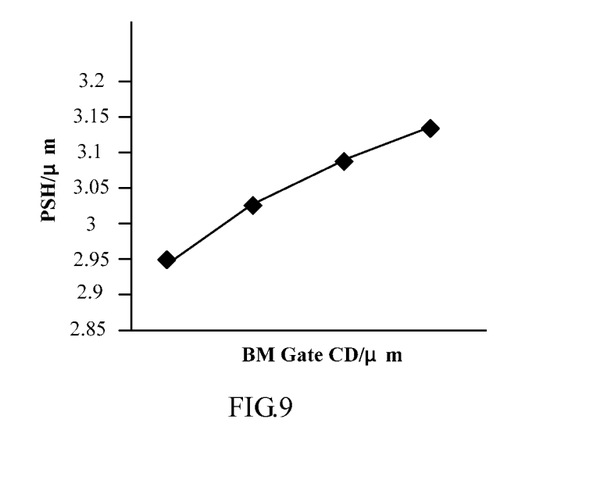
FIG. 9 is a schematic view showing the heights of spacers versus the width of the black matrix pattern in the column direction of the black matrix pattern in an embodiment of the present invention.

For example, given other conditions fixed, the experimental results of spacer heights in experiment versus the widths of black matrix pattern 2 at locations where they are located in the column direction of the black matrix pattern are shown in FIG. 9. The results indicate that the larger the width of the black matrix pattern 2 in column direction of the black matrix pattern, the higher the spacer formed at the location is.

In addition, liquid crystal displays tend to generate static electricity during operation, which influences the internal electric field of the liquid crystal displays and result in picture distortion of the liquid crystal displays. Generally, it is possible to form a transparent conductive film on one side of the substrate on which the black matrix pattern and the color filter pattern are disposed. In this way, the influence of static electricity on the picture of a liquid crystal display is effectively reduced while not reducing the light transmittance of the color filter substrate. The transparent conductive film may be fabricated by a transparent conductive material such as indium tin oxide or indium zinc oxide, and may also be a transparent conductive film deposited by various means such as sputtering, evaporation or plasma enhanced chemical vapor deposition.

While preparing the color filter substrate with the above-mentioned method, an ordinary mask is simply used in the preparing process, therefore the preparing cost is low. At the same time, since the width L of an primary area of the black matrix pattern in the column direction of the black matrix pattern is greater than the width l of a secondary area of the black matrix pattern in the column direction of the black matrix pattern, which makes the locations of primary spacers and secondary spacers have different flatness degree, and since the black matrix pattern at the locations of primary spacers has a larger width, the planarization layer formed at primary spacers in turn has a larger height of the planarization layer at secondary spacers. Therefore, in case that openings for primary spacers and secondary spacers on the mask differ from each other small in size, primary spacers and secondary spacers with height difference but similar size can be easily formed on the color filter substrate simply by exposure, and these two spacers have more uniform topography, which can implement better support effect and enhance the display quality.

In the above description, for example, the column direction of the black matrix pattern on the color filter substrate corresponds to the extension direction of data lines on the array substrate disposed opposite to the color filter substrate, while the row direction of the black matrix pattern on the color filter substrate is the same as the extension direction of gate lines on the array substrate. For example, the row direction of the black matrix pattern is perpendicular to the column direction.

Embodiment 2

Based on the preparing method of the color filter substrate provided in FIG. 1, an embodiment of the present invention further provides a color filter substrate including a substrate 1 that may be a glass substrate or a quartz substrate with good light transmittance, and a black matrix pattern 2. In one example, the black matrix pattern includes primary areas and secondary areas, and the primary area has a width L in the column direction of the black matrix pattern greater than the width l of the secondary area in the column direction of the black matrix pattern. The material for the black matrix pattern 2 may be carbon black or black resin.

It is to be noted that the black matrix pattern includes primary areas and secondary areas. For example, any row of the black matrix pattern 2 includes primary areas 3 and/or secondary areas 4. For example, this may be extended to the following cases.

In case I, as shown in FIG. 2, at least one row of the black matrix pattern 2 includes only primary areas 3, and other rows of the black matrix pattern 2 include only secondary areas 4.

In case II, as shown in FIG. 3, each row of the black matrix pattern 2 includes both primary areas 3 and secondary areas 4.

In case III, at least one row of the black matrix pattern 2 includes only primary areas 3, and other rows of the black matrix pattern 2 include both primary areas 3 and secondary areas 4.

In case IV, at least one row of the black matrix pattern 2 includes only secondary areas 4, and other rows of the black matrix pattern 2 include both primary areas 3 and secondary areas 4.

In case V, at least one row of the black matrix pattern 2 includes only primary areas 3, at least one row of the black matrix pattern 2 includes only secondary areas 4, and other rows of the black matrix pattern 2 include both primary areas 3 and secondary areas 4.

It is to be noted that any row of the black matrix pattern 2 including primary areas 3 and/or secondary areas 4 includes the above five cases rather than being limited to the above five cases. In an embodiment of the present invention, the black matrix pattern 2 on the substrate may further include several rows of the black matrix pattern that neither include primary area nor secondary area in addition to the black matrix pattern described in case I. Similarly, it is also possible to extend cases I to V according to practical situation, and extensions will not be enumerated herein in embodiments of the present invention.

In addition, the length of a primary area 3 in the row direction of the black matrix pattern 2 may be greater than or equal to the width of primary spacers 7, and the length of a secondary area 4 in the row direction of the black matrix pattern 2 may be greater than or equal to the width of the secondary spacers 8. For example, as shown in FIGS. 2 and 3, the length of a primary area 3 in the row direction of the black matrix pattern 2 is greater than the width of primary spacers 7, the length of a secondary area 4 in the row direction of the black matrix pattern 2 is greater than the width of the secondary spacers 8. As shown in FIG. 4, and the length of a primary area 3 in the row direction of the black matrix pattern 2 is equal to the width of primary spacers 7, and the length of a secondary area 4 in the row direction of the black matrix pattern 2 is equal to the width of the secondary spacers 8. In addition, other cases may be further included, and these cases will not be enumerated in embodiments of the present invention.

In at least one embodiment, the color filter substrate may further include a color filter pattern 5 that may include red areas, green areas and blue areas, and each area includes a resin material colored with organic pigment with corresponding color.

In at least one embodiment, the color filter substrate may further include a planarization layer 6 on the black matrix pattern 2 and the color filter pattern 5. The planarization layer 6 includes a transparent protection layer and may further include a transparent conductive layer.

The primary spacers 7 and the secondary spacers 8 on the planarization layer 6 are formed on the planarization layer 6. In one example, the primary spacers 7 are located on primary areas 3 of the black matrix pattern 2; and the secondary spacers 8 are located on secondary areas 4 of the black matrix pattern 2. The primary spacers 7 have a height greater than that of the secondary spacers 8. For example, the height difference between primary spacers 7 and secondary spacers 8 is 0.3~0.5 μm.

In one example, It is also possible to provide a transparent conductive film on one side of the substrate 1 on which the black matrix pattern 2 and the color filter pattern 5 are not disposed, which functions to effectively reduce the influence of static electricity on the liquid crystal display picture while not reducing the light transmission of the color filter substrate. The transparent conductive film may be made of transparent conductive materials such as iridium tin oxide or indium zinc oxide.

The embodiment of the present invention provides a color filter substrate including the above-mentioned structure in which the black matrix pattern disposed thereon includes primary areas and secondary areas and primary spacers and secondary spacers located on the primary areas and the secondary areas, and primary spacers and secondary spacers have a small size difference and more uniform topography, which makes the liquid crystal cell formed of the color filter substrate and the array substrate more stable, and endows liquid crystal displays applying the color filter substrates with better display effects.

Embodiment 3

Figure 10:
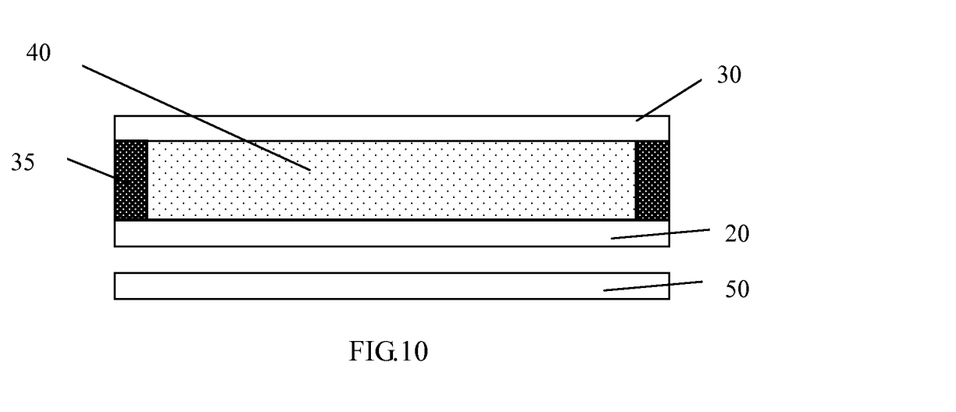
FIG. 10 is a structure diagram of a display device in an embodiment of the present invention.

In addition, an embodiment of the present invention further provides a display device including the color filter substrate. As shown in FIG. 10, the display device of the embodiment of the present invention may include an array substrate 20 and a color filter substrate 30 disposed opposite to each other to form a liquid crystal cell with sealant 35, in which liquid crystal material 40 is filled. The pixel electrode of each sub-pixel unit of the array substrate 20 is configured to apply an electric field to control the degree of rotation of the liquid crystal material, thereby implementing display operation. In some embodiments, the touch display device may further include a backlight source 50 for providing backlight for the array substrate 20. The display device may be any product or components with display function such as a liquid crystal panel, an organic light emitting diode panel, a cell phone, a flat computer, a TV set, a display, a notebook computer, a digital picture frame, a navigator and so on.

What have been described above are only some implementations of the present invention. However, the scope of the present invention is not limited thereto. One skilled in the art can easily contemplate variations or substitutions within the technical scope disclosed by the present invention, which should all be covered in the scope of the present invention. Therefore, the scope of the present invention should be defined by the scope of the described claims.

The present application claims priority of a China patent application No. 201310632632.5 filed on Dec. 2, 2013, which is incorporated in its entirety herein by reference as part of the present application.

The invention claimed is:

1. A preparing method of a color filter substrate comprising:
preparing a black matrix pattern and a color filter pattern on a substrate;
preparing a planarization layer on the color filter pattern and the black matrix pattern; and
preparing spacers on the planarization layer,
wherein
the color filter pattern comprises a plurality of color filter elements, a size of each color filter element, measured in a column direction of the color filter pattern, is larger than a size of the color filter element measured in a row direction, the black matrix pattern comprises a primary area and a secondary area, the primary area is disposed between two color filter elements which are substantially aligned along the column direction, the secondary area is disposed between another two color filter elements which are substantially aligned along the column direction, a width of the primary area in the column direction is greater than a width of the secondary area in the column direction, and the spacers comprise a primary spacer and a secondary spacer, the primary spacer is disposed on the primary area of the black matrix pattern, the secondary spacer is disposed on the secondary area of the black matrix pattern, and the primary spacer has a height greater than that of the secondary spacer.

2. The preparing method of the color filter substrate of claim 1, wherein any row of the black matrix pattern comprises the primary area and/or the secondary area.

3. The preparing method of the color filter substrate of claim 1, wherein a length of the primary area in the row direction is greater than or equal to a width of the primary spacer, and a length of the secondary area in the row direction is greater than or equal to a width of the secondary spacer.

4. The preparing method of the color filter substrate of claim 1, wherein the preparing of the spacers on the planarization layer comprises:

forming the primary spacer and the secondary spacer with a spacer mask, wherein the spacer mask comprises a first opening corresponding to the primary spacer and a second opening corresponding to the secondary spacer, and the first opening has a greater size than that of the second opening.

5. The preparing method of the color filter substrate of claim 4, wherein the preparing of the spacers on the planarization layer comprises:

coating photoresist on the planarization layer; and
processing the photoresist with the spacer mask to form the primary spacer and the secondary spacer.

6. The preparing method of the color filter substrate of claim 1, further comprising:

forming a transparent conductive film on a side of the substrate, opposite to a side on which the black matrix pattern and the color filter pattern are disposed.

7. A color filter substrate comprising: a substrate, a black matrix pattern, a color filter pattern, a planarization layer, a primary spacer and a secondary spacer, wherein the black matrix pattern and the color filter pattern are disposed on the substrate, the color filter pattern comprises a plurality of color filter elements, a size of each color filter element, measured in a column direction of the color filter pattern, is larger than a size of the color filter element measure in a row direction, the black matrix pattern comprises a primary area and a secondary area, the primary area is disposed between two color filter elements which are substantially aligned along the column direction, the secondary area is disposed between another two color filter elements which are substantially aligned along the column direction, a width of the primary area in the column direction is greater than a width of the secondary area in the column direction, the planarization layer is disposed at a side, of the color filter pattern and the black matrix pattern, that is opposite to the substrate, and the primary spacer and the secondary spacer are disposed at a side, of the planarization layer, that is opposite to the substrate, the primary spacer is disposed on the primary area of the black matrix pattern, the secondary spacer is disposed on the secondary area of the black matrix pattern, and the primary spacer has a height greater than that of the secondary spacer.

8. The color filter substrate of claim 7, wherein any row of the black matrix pattern comprises the primary area and/or the secondary area.

9. The color filter substrate of claim 7, wherein a length of the primary area in the row direction is greater than or equal to a width of the primary spacer, and a length of the secondary area in the row direction is greater than or equal to a width of the secondary spacer.

10. The color filter substrate of claim 7, further comprising: a transparent conductive film disposed on a side of the substrate opposite to a side on which the black matrix pattern and the color filter pattern are disposed.

11. A display device comprising the color filter substrate of claim 7.

12. The preparing method of the color filter substrate of claim 2, wherein a length of the primary area in the row direction is greater than or equal to a width of the primary spacer, and a length of the secondary area in the row direction is greater than or equal to a width of the secondary spacer.

13. The preparing method of the color filter substrate of claim 2, wherein the preparing of the spacers on the planarization layer comprises:

forming the primary spacer and the secondary spacer with a spacer mask, wherein the spacer mask comprises a first opening corresponding to the primary spacer and a second opening corresponding to the secondary spacer, and the first opening has a greater size than that of the second opening.

14. The preparing method of the color filter substrate of claim 13, wherein the preparing of the spacers on the planarization layer comprises:

coating photoresist on the planarization layer; and
processing the photoresist with the spacer mask to form the primary spacer and the secondary spacer.

15. The preparing method of the color filter substrate of claim 3, wherein the preparing of the spacers on the planarization layer comprises:

forming the primary spacer and the secondary spacer with a spacer mask, wherein the spacer mask comprises a first opening corresponding to the primary spacer and a second opening corresponding to the secondary spacer, and the first opening has a greater size than that of the second opening.

16. The preparing method of the color filter substrate of claim 15, wherein the preparing of the spacers on the planarization layer comprises:

coating photoresist on the planarization layer; and
processing the photoresist with the spacer mask to form the primary spacer and the secondary spacer.

17. The color filter substrate of claim 7, wherein
the primary area is in direct contact with the two color filter elements; and
the secondary area is in direct contact with the another two color filter elements.

18. The color filter substrate of claim 7, wherein
at least two of the plurality of color filter elements are different from each other in shape, or
at least two of the plurality of color filter elements are different from each other in length in the column direction.

19. The color filter substrate of claim 7, wherein
opposite surfaces of the planarization layer in a direction perpendicular to the substrate are respectively in direct contact with the black matrix pattern, and the primary spacer and secondary spacer.

20. The color filter substrate of claim 7, wherein
a height of a region, which is in a vertical alignment with the primary spacer, of the planarization layer is greater than a height of a region, which is in a vertical alignment with the secondary spacer, of the planarization layer.

* * * * *